3,465,070
METHOD OF PRODUCING THERMOPLASTIC FILM CHARACTERIZED BY IMPROVED PROPERTIES
Keith L. Smith, Charleston, W. Va., and Joseph V. Petrone, Shrewsbury, Mass., assignors to Union Carbide Corporation, a corporation of New York
No Drawing. Filed May 20, 1966, Ser. No. 551,556
Int. Cl. B29c 17/04
U.S. Cl. 264—88                                   10 Claims

ABSTRACT OF THE DISCLOSURE

Marked improvement in such properties as stress endurance, clarity, gloss, tensile strength and gas impermeability is imparted to films of poly(ethylene oxide) and other high polymers by a cold-rolling process which involves very high levels of nip pressure and web tension. The product films are free of wrinkles, folds, tears, striations and other imperfections commonly imparted during cold-rolling.

---

This invention relates to a method of producing thermoplastic film which is characterized by improved properties. More particularly, this invention relates to a method of cold-rolling thermoplastic film whereby the resultant film is characterized by freedom of imperfections such as undesirable wrinkles, folds, tears and striations commonly imparted to thermo-plastic film during previously employed cold-rolling operations and optionally possesses such desirable properties as excellent clarity, gloss, tensile strength, impact strength, and low gas permeability.

In recent years, thermoplastic film has found increased use in a wide variety of applications, particularly as a packaging medium for edible materials such as fruit, vegetables, and meat. In these and other comparable applications, it is essential that the film be comparatively thin on the order of about 2 mils or less, be characterized by excellent physical properties in order to render such material capable of being exposed to strenuous handling without rupturing and also be characterized by excellent surface properties in order that the package be aesthetically attractive to the prospective purchaser, and enhance, rather than detract from, the appearance of the contents of the package.

The requirement that thermoplastic film, for many applications, be relatively thin, and further characterized by excellent physical strength and by excellent surface properties has presented serious processing problems in the production thereof. It has been found that thermoplastic film produced by methods commonly employed such as calendering, extruding, casting and the like, is characterized by variations in thickness which is particularly critical across the width of the film due to the fact that film weakness is more pronounced across the film width and film strength determination is made at the thinnest portion of the film.

Prior attempts to eliminate variations in film thickness, as for example by cold-rolling the thermoplastic film, have not proven to be successful, especially when attempts have been made to produce cold-rolled film having a thickness of less than about 2 mils. Cold-rolling of thermoplastics to a thickness of less than about 2 mils by means of methods currently known results in the production of film which is characterized by wrinkles, fold-overs, rips, tears, bunching, waviness, striations and other undesirable imperfections without substantially eliminating variations in the film thickness.

Variations in thermoplastic film thickness which are not eliminated by currently known cold-rolling methods, are due to the fact that thermoplastic film when fed into the nip of a cooperating set of compression rolls, varies in thickness across the width of the film and does not exactly match the variations in the "roll nip" separation. The "roll nip" separation is generally defined as the distance separating the two compression rolls in that plane through the roll axis which marks the closest approach of the surfaces of the two rolls to each other. Changing the crown of the rolls by grinding, or roll crossing, roll bending or other similar means, although effecting some improvement, does not result in elimination of the problem of variable film thickness. This is due to the fact that it is practically impossible to obtain an exact match betwen the film thickness pattern and the roll nip dimensions. In those instances where the film thickness pattern and the roll nip dimensions do not match, which is generally the case, certain longitudinal segments of the thermoplastic film passing through the nip of the rolls are reduced in thickness by an amount greater than other such segments. Since there is no measurable change in volume or density of the film, this results in a build up of an increased volume of film in front of those portions of the work rolls where the thickness reduction is the greatest. This in turn results in wrinkling and lateral bunching of the thermoplastic film. Also the thermoplastic film will "fold-over" in front of the roll nip either at the center of or in the side areas of the film. This results in a triple thickness of film being fed to certain areas of the roll nip and a single thickness of film being fed to other areas of the roll nip at the same time. Under such conditions a relatively great reduction in film thickness takes place in the area of triple thickness folded-over portions of the thermoplastic film with relatively little thickness reduction in other areas of the film. Obviously, the resultant film produced is unacceptable for commercial use.

It has now been found that thermoplastic film can be successfully cold-rolled to produce film having a uniform thickness of as little as or less than 2 mils, if so desired, and characterized by the desirable properties previously discussed.

According to the present invention, thermoplastic film is cold-rolled by being passed through compression rolls wherein both rolls are compressed simultaneously to develop a minimum nip pressure of 6,000 lbs. per inch of film width.

In general, this nip pressure will be reached on most machines designed to operate with a negative roll clearance when the negative roll clearance is of the order of 10 to 40 mils or greater. The exact correspondence of negative roll clearance with nip pressure will vary substantially with the type of machine and its mechanical condition. Additionally the thermoplastic film is subjected to a longitudinal tension in excess of the tension required to take up the slack in the film, at least about 0.25 lb./inch of film width/0.001 inch of film thickness to a maximum tension not exceeding the tensile strength of the thermoplastic film.

Although the nip pressure is generally at least about 6,000 lbs./inch of film width, the preferred operating range is from about 7,000 to about 12,000 lbs./inch of film width.

Nip pressure is determined by dividing the total load by the material width, the total load having been obtained by use of a Simon and Ruge strain gage attached to the rolls to obtain a roll separation force measurement.

While, as previously stated, the tension maintained on the film is from at least about 0.25 lb./inch of film width/ 0.001 inch of film thickness to a maximum tension not exceeding the tensile strength of the thermoplastic film preferably the tension maintained on the film during the cold-rolling thereof is from about 0.5 to about 1.0 lb./inch of film width/0.001 inch of film thickness.

The speed of the thermoplastic film as it is passed through the compression rolls can be varied over a wide range. Preferably, however, the speed of the thermoplastic film as it is fed into the nip of the compression rolls is in excess of about 20 feet per minute, and still more preferably from about 100 to about 225 feet per minute. Higher or lower speeds can be employed with equal success.

The temperature at which the thermoplastic film is cold-rolled is generally room temperature but temperatures up to about 50° C. can be utilized with excellent results.

The diameter of the compression rolls is not critical to the practice of this invention. As a rule, standard compression rolls having a diameter of from about 1 inch to about 22 inches can be employed in the practice of this invention.

However, due to the fact that the amount of thickness reduction which can be effected in a given pass varies inversely with the compression roll diameter, compression rolls having a diameter in excess of about 6 inches are preferably employed to produce thin thermoplastic film exhibiting the desirable properties hereinbefore enumerated.

By employing the method of the invention almost any film thickness can be obtained exhibiting the desirable properties previously enumerated. The reduction in thickness of the thermoplastic film will depend, inpart upon the thickness of the film fed into the compression rolls, and the degree of thickness reduction per pass provided by the particular compression rolls employed.

Any thermoplastic film which can be normally worked at room temperature can be cold-rolled in accordance with this invention. Thermoplastics from which such film can be produced are the poly(olefin oxides) such as poly (ethylene oxide), poly(propylene oxide) and the like. Other suitable thermoplastics are polyethylene, high-density polyethylene, polypropylene, polyvinylchloride, vinyl chloride-vinyl acetate copolymers, and the like.

The poly(ethylene oxide) used in the present invention is further described in U.S. Patent 3,020,231 especially in column 7 line 45 to column 10 line 32. Poly(ethylene oxide) of a molecular weight from 200,000 to 4,000,000 may be used according to the invention.

The compression rolls can be made of any suitable material such as metal or the like which will deform elastically over the range of nip pressures of at least 6,000 lbs./inch or 7,000 lbs./inch film width preferably 7,000–12,000 lbs./inch film width.

In order to facilitate the cold-rolling operation, it is desirable to direct a stream of a lubricant-coolant such as oil or an oil-and-water-emulsion at the nip of the compression rolls. The lubricant-coolant can be removed from the film, subsequent to the compression step, by any convenient removal means, as for example, by the use of wipers or an air stream.

In order to demonstrate the necessity of operating at high roll nip pressures or negative clearance at the nip while maintaining the thermoplastic film under tension both of which have been previously defined, a number of controls were run which substantiate the criticality of the requirements of the present invention.

CONTROL 1

A double Y Sendzimir mill equipped with 8 inch diameter flat compression rolls (without a crown) is adjusted to provide a clearance of about 8 mils at the nip. A calendered poly (ethylene oxide) film having an average molecular weight of 600,000 having a thickness of 16 to 18 mils is fed through the compression rolls under a tension in excess of 0.25 lb./inch of film width/per 0.001 inch of film thickness. The cold-rolled thermoplastic film so produced contains many imperfections, chiefly wrinkles and a considerable number of areas of fold-over.

CONTROL 2

Control 1 is repeated with the exception that the clearance at the nip is set at zero. The poly(ethylene oxide) film so processed contains imperfections similar to those exhibited by the film processed according to Control 1, with numerous areas of fold-over.

CONTROL 3

Control 1 is repeated with the exception that compression rolls having a 0.012 inch crown are employed. The cold-rolled poly(ethylene oxide) film produced by maintaining an average clearance of about 6 mils at the nip, contain imperfections similar to the films produced while observing the conditions set forth in Controls 1 and 2.

CONTROL 4

Control 2 is repeated with the exception that compression rolls having a 0.012 inch crown are employed. The cold-rolled poly(ethylene oxide) film so produced contains areas of fold-over and wrinkles.

In each of Controls 1 to 4 the film is processed at a rate of 20 feet per minute.

CONTROL 5

Controls 1 to 4 are repeated with the exception that the tension on the film in each run is maintained at less than 0.25 lb./inch of film width/0.001 inch of film thickness. In each instance, the cold-rolled films exhibit an undesirable wavy appearance.

CONTROL 6

In this control the equipment used is a four roll, inclined Z plastics calendar having compression rolls 8 inches in diameter, and a means for providing a tension on the film greater than 0.25 lb./inch of film width/0.001 inch of film thickness. Thermoplastic film similar to the film employed in Controls 1 to 5 is cold-rolled at speeds varying from 20 feet per minute to 60 feet per minute while maintaining a pressure of 4,200 lbs./inch of film width at the roll nip and a film tension of greater than 0.25 lb./inch of film width/0.001 inch of film thickness on the thermoplastic film. The cold-rolled film contains numerous areas of fold-over.

The following examples further illustrate the present invention and are not intended to limit the scope thereof in any manner.

Example 1

A double Y Sendzimir mill equipped with 8 inch diameter flat compression rolls (without a crown) is adjusted to approximately 6,000 lb. nip pressure by a setting of 40 mills negative clearance at the nip. A calendered poly(ethylene oxide) film identical to the film cold-rolled in Controls 1 to 4 is fed through the compression rolls while maintaining a tension on the film in excess of 0.25 lb./inch of film width/0.001 inch of film thickness and a processing speed of 20 feet per minute. The cold-rolled thermoplastic film so produced is free of wrinkles, fold-overs and other imperfections and has a thickness of 2.5 to 3 mils.

Example 2

A calendered poly(ethylene oxide) film identical to that used in Controls 1 to 4 having a thickness of 3.5 mils is passed through compression rolls adjusted to provide a below zero clearance of 50 mils at the nip, and a pressure of about 10,000 lb./inch of film width on the film, while maintaining a web tension of greater than 0.25 lb./inch of film width/0.001 inch of film thickness, and a film processing rate of 100 feet per minute. The processed film has a thickness of 0.6 mil to 1.7 mils and exhibits excellent surface characteristics.

Example 3

Example 2 is repeated with the exception that the film is processed at a rate of 225 feet per minute. The processed film is free of wrinkles and fold-overs and has excellent clarity.

Example 4

A sheet of "high density" polyethylene having a thickness of 35 mils is processed by being passed through compression rolls set at 50 mils below zero clearance at the nip to produce a pressure of about 10,000 lb./inch of film width on the film, while maintaining a tension on the web in excess of 0.25 lb./inch of film width/0.001 inch of film thickness and a processing speed of 20 feet per minute. The resultant film has excellent clarity, is free of surface imperfections, and has a thickness of 5.5 mils.

Example 5

The equipment which is used in conducting this example is made up of a two-high, four-high combination metal working mill having a coiler and uncoiler, web tension controls, and a circulating lubricant-coolant system at the roll nip. The mill is operated as a two-high mill using rolls having accurate indication and control of roll speed, the rolls having a diameter of 8½ inches and a face of 10 inches. Using this equipment, excellent quality film having a thickness of about 0.8 mil is produced by feeding a poly(ethylene oxide) film having an average molecular weight of 600,000 having a thickness of 3.5 mils and a width of 8 inches through compression rolls operating at greater than 40 mils negative clearance to produce a pressure on the film of about 10,000 lbs. per inch of film width while the thermoplastic film is subject to a tension of 0.8 to 1.0 lb./inch of film thickness/0.001 inch of film thickness, and varying the film speed from 100 feet per minute to 225 feet per minute.

The physical properties of thermoplastic films cold-rolled in accordance with this invention are tabulated below in Table I. The values set forth in Table I are obtained by the following procedures.

Tensile strength—ASTM D–882–61T
Elongation percent—ASTM D–882–61
Tear strength—ASTM 0689–42T
Impact strength—ASTM 1709–59T Stress endurance is measured by clamping rectangular strips of film ½ inch wide in such a way as to give an initial gage length of 3 inches. Weighed amounts of lead shot in a bottle are attached to the lower clamp to give a loading in pounds per square inch of film cross-section equal to either 750 p.s.i. or 1000 p.s.i. Testing is done at a constant temperature of 75° F. and a relative humidity of 45 percent. Trip switches are positioned under the bottles of lead shot which activated a time recorder when the sample breaks. Those cases where the film elongates at least one inch when the load is first applied are listed as "yielded." Stress endurance is tested both parallel and perpendicular to the machine direction of the film sample.

What is claimed is:

1. A method of processing thermoplastic film selected from a member of the group consisting of poly(ethylene oxide) polyethylene, polypropylene, polyvinyl-chloride and vinyl chloride-vinyl acetate copolymers which comprises cold rolling said thermoplastic by (a) passing said thermoplastic film through cooperating compression rolls, adjusted to produce a pressure on said thermoplastic film at the nip of said rolls in excess of about 6,000 pounds/inch of film width while (b) subjecting said film to a tension of at least 0.25 lb./inch of film width/0.001 inch of film thickness.

2. A method as defined in claim 1 wherein the tension on the film is from about 0.5 to about 1.0 lb./inch of film width/0.001 inch of film thickness.

3. A method as defined in claim 1 wherein the speed of the thermoplastic film as it is fed into the nip of the compression rolls is in excess of about 20 feet per minute.

4. A method as defined in claim 3 wherein the speed of the thermoplastic film is from about 100 to about 225 feet per minute.

5. A method as defined in claim 1 wherein the pressure at said nip is in excess of about 7000 lbs./inch of film width.

6. The method of claim 5 wherein the pressure at said nip is from about 7,000 lbs./inch of film width to about 12,000 lbs./inch of film width.

7. The method of claim 6 comprising directing a stream of lubricant-coolant at said nip of said compression rolls.

8. The method of any of the foregoing claims 1 through 7 where said thermoplastic film comprises poly(ethylene oxide).

9. The method of any one of the foregoing claims 1 through 7 where said thermoplastic film comprises poly(ethylene oxide) having a molecular weight of from 200,000 to 4,000,000.

10. The method of any one of the foregoing claims 1 through 7 wherein said thermoplastic film comprises polyethylene.

TABLE I

| Film Description | Direction of test [1] | Average thick. (mils) | Tensile properties [2] | | | | Elmendorf [3] tear strength (gms./mil) | Dart [3] impact strength (gms.) | Stress endurance time [3] (hrs.-min.) | |
| --- | --- | --- | --- | --- | --- | --- | --- | --- | --- | --- |
| | | | Tensile strength (p.s.i.) | | Elongation, percent | | | | 750 p.s.i. | 1000 p.s.i. |
| | | | Yield | Break | Yield | Break | | | | |
| Extruded poly(ethylene oxide) avg. m. wt. 600,000. | Parallel | 1.8 | 1,428 | 3,175 | 12 | 596 | No tear | 725 | 10:47 | Yield |
| | Rt. angle | | 1,509 | 2,015 | 12 | 557 | No tear | | 13:21 | Yield |
| Calendered poly(ethylene oxide) avg. m. wt. 600,000. | Parallel | | 1,024 | 2,155 | 21 | 958 | | | 8:04 | Yield |
| | Rt. angle | | 1,222 | 1,951 | 24 | 838 | | | 4:30 | Yield |
| Cold-rolled from 8 mil extruded stock (no plasticizer). | Parallel | 3.1 | 2,456 | 8,387 | 21 | 290 | 28.5 | >900 | 23:02 | |
| | Rt. angle | | 2,051 | 2,323 | 23 | 858 | No tear | | | |
| Poly(ethylene oxide) avg. m. wt. 600,000 cold-rolled from 6 mil extruded stock (10% Tergitol NP40 (3) plasticizer. | Parallel | 2.0 | 2,150 | 6,807 | 29 | 153 | 415 | >900 | 200:00 | |
| | Rt. angle | | 1,862 | 2,342 | 19 | 788 | No tear | | 24:38 | Yield |

[1] Relative to the machine-direction of the film.
[2] Tests run at 20 inches per minute crosshead speed.
[3] Polyether of an average of 1 mole nonylphenol to 20 mols ethylene oxide.

(References on following page)

References Cited

UNITED STATES PATENTS

| | | |
|---|---|---|
| 2,642,625 | 6/1953 | Peck. |
| 2,790,999 | 5/1957 | Peck et al. |
| 2,952,878 | 9/1960 | Swerlick et al. |
| 3,083,410 | 4/1963 | McGlamery _____ 264—289 |
| 3,194,863 | 7/1965 | Williams et al. _____ 264—88 |
| 3,340,235 | 9/1967 | Holt _____ 264—288 X |
| 3,345,447 | 10/1967 | Grant _____ 264—176 X |
| 3,354,023 | 11/1967 | Dunnington et al. __ 264—288 X |

FOREIGN PATENTS

| | | |
|---|---|---|
| 773,718 | 5/1957 | Great Britain. |
| 973,476 | 10/1964 | Great Britain. |
| 1,307,642 | 9/1962 | France. |

JULIUS FROME, Primary Examiner

J. H. WOO, Assistant Examiner

U.S. Cl. X.R.

264—175, 210, 288, 291